Patented Feb. 3, 1953

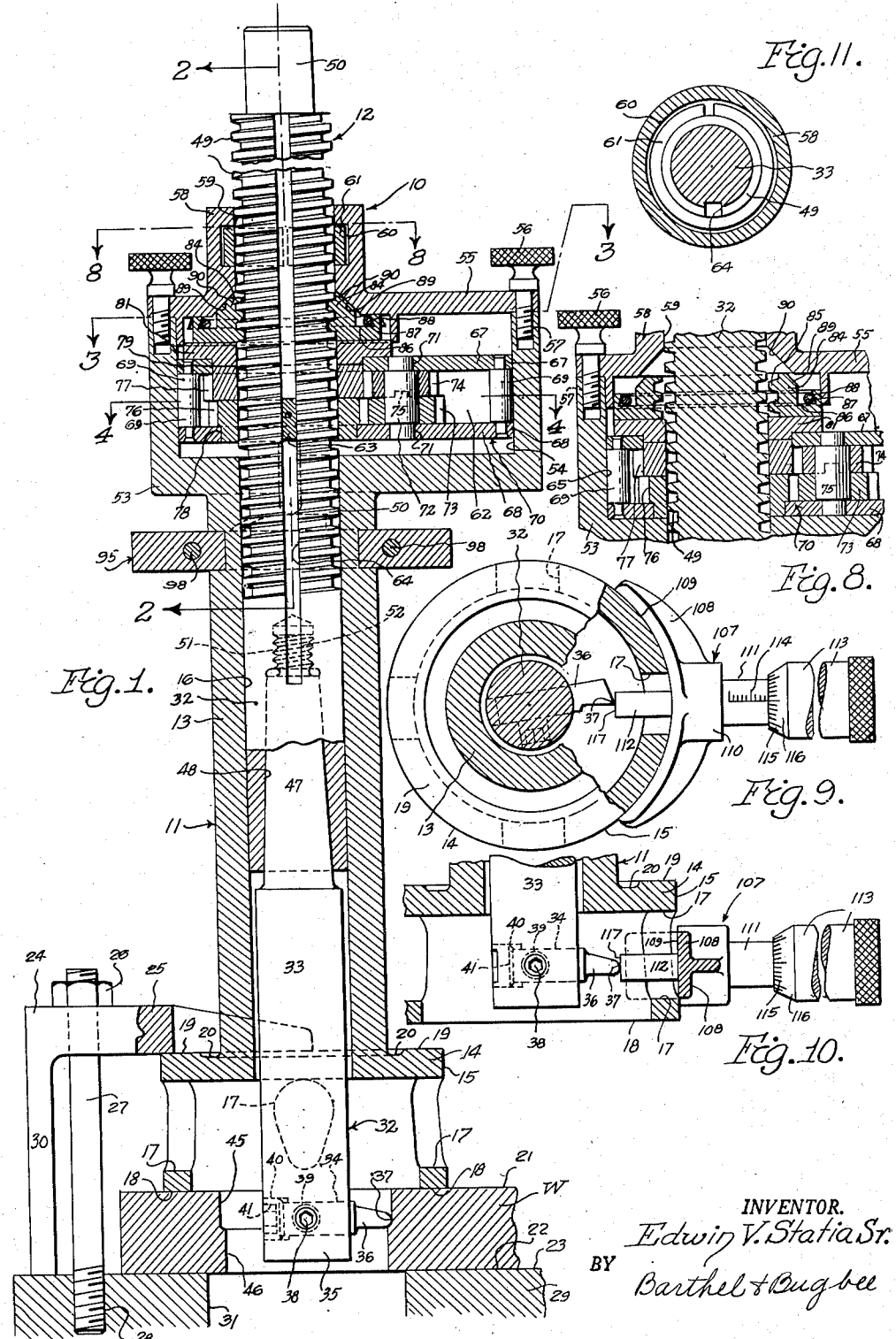

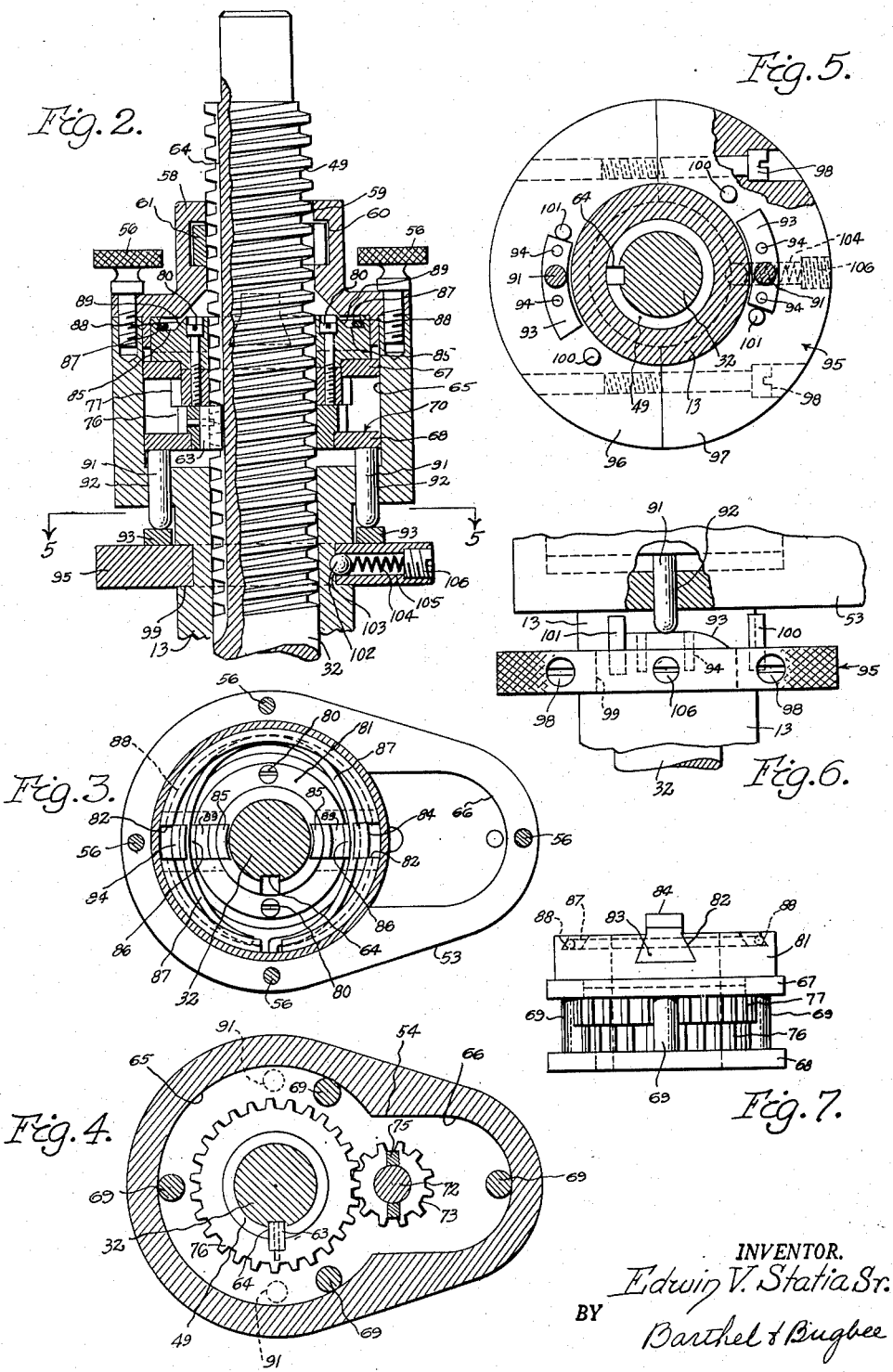

2,627,193

UNITED STATES PATENT OFFICE 2,627,193

PRECISION BORING DEVICE

Edwin V. Statia, Sr., Royal Oak, Mich., assignor of one-half to Edward L. Chapman, Detroit, Mich.

Application May 29, 1948, Serial No. 30,163

7 Claims. (Cl. 77—2)

1

This invention relates to machine tools and, in particular, to precision boring machines.

One object of this invention is to provide a precision boring machine, wherein a boring tool is rotated and automatically fed into a roughly-drilled hole in the workpiece to bore it to a precision diameter and location, the machine being so constructed that the boring bar can be retracted from time to time and gauges inserted in order to check the progress and accuracy of the work.

Another object is to provide a precision boring machine having a supporting portion adapted to be mounted on the work and precisely located relatively to a predetermined starting point, as by the use of precision gauge blocks, the hole which is precisely bored being then used as a point of reference for the boring of another hole, and so on until the required number and location of holes has been bored.

Another object is to provide a precision boring machine wherein the feeding mechanism is so constructed that the operator may terminate the feeding action and retract the boring bar by a mere turn of the wrist in order to inspect and check from time to time the bore being made.

Another object is to provide a precision boring machine of the foregoing character wherein the radius of the cutting point or tip of the cutting tool from the axis of rotation of the boring bar may be accurately measured in a simple and direct manner.

Another object is to provide a precision boring machine of the foregoing character wherein feed gearing is provided for advancing the boring bar longitudinally at a very slow and gradual speed while it is being rotated, such as by a flexible shaft connected to a suitable source of power.

Another object is to provide a precision boring machine of the foregoing character which is portable and entirely self-contained, except for its connection to an external source of power, with the result that the machine can be moved from place to place over the workpiece in a precise manner so that the holes to be bored will be located with extreme accuracy and their dimensions will be maintained within very narrow and precise limits, the machine being thereby well suited for the production of precision jigs, fixtures, tools, dies or other devices requiring a high order of accuracy.

In the drawings:

Figure 1 is a central vertical section through a preferred form of precision boring machine according to the invention, with the various parts of the feeding mechanism shown in their driving positions;

Figure 2 is a central vertical section through the upper portion of the machine shown in Figure 1, taken at right angles thereto along the line 2—2 therein.

Figure 3 is a horizontal section taken along the line 3—3 in Figure 1;

Figure 4 is a horizontal section taken along the line 4—4 in Figure 1;

Figure 5 is a horizontal section taken along the line 5—5 in Figure 2;

Figure 6 is a fragmentary left-hand side elevation of the feed disconnecting mechanism shown in vertical section in Figure 2;

Figure 7 is a left-hand side elevation of the feeding mechanism, in the upper part of Figure 1, removed from its housing;

Figure 8 is a fragmentary vertical section through the feeding mechanism shown in Figure 1, but with the feeding mechanism shown in its disconnected position so that the boring bar may be manually lifted out of the hole being bored, for inspection or checking purposes;

Figure 9 is a horizontal section through the tubular support for the lower portion of the machine immediately above its enlargement, partly broken away to show the use of a micrometric measuring instrument for precisely setting the tip of the boring tool at a predetermined radius from the axis of rotation of the boring bar;

Figure 10 is a fragmentary central vertical section through the structure shown in Figure 9; and Figure 11 is a horizontal section along the line 11—11 in Figure 1.

Referring to the drawings in detail, Figure 1 shows a precision boring machine generally designated 10 as consisting generally of a tubular support 11 in which a rotatable member or screw shaft 12 is rotatably mounted. The tubular support 11 has a tubular stem 13 terminating at its lower end in a cylindrical enlarged portion 14 having an outer cylindrical surface 15 which is precisely ground to be as nearly co-axial as possible with the cylindrical bore 16 in the stem 13. The cylindrical portion 14 is provided with elongated access openings 17 arranged at intervals around the cylindrical surface 15 for the insertion of special micrometer calipers for measuring the diameter of the bore while it is being produced and also for setting the diameter of the boring tool.

The cylindrical portion 15 is also provided with precisely ground lower and upper annular surfaces 18 and 19, the latter being surrounded by an annular relieved portion or depression 20. The surface 18 is adapted to rest upon the upper surface 21 of the workpiece W, the lower surface 22 of which rests upon a precisely finished surface 23 against which it is held by a hold-down clamp 24. The latter is approximately L-shaped with its horizontal portion 25 yoke-shaped and forced down against the surface 19 of the cylindrical portion 14 by a nut 26 threaded upon the upper portion of a stud 27, the lower portion of which is threaded into a socket 28 in the bed 29 having the precision upper surface 23. The clamp 24 has a vertical portion 30 resting at its lower end upon the surface 23.

The bed 29 is provided with an aperture or recess 31 serving as a relief opening for a boring tool generally designated 32. The latter consists of a shaft portion or boring bar 33 having a transverse bore 34, preferably of square cross-section, near its lower end 35. The bore 34 serves to receive the shank of a tool bit 36 having a cutting tip 37. The tool bit 36 is of a cross-section adapted to fit the bore 34, such as of a square cross-section, and is held in position therein by a headless set screw 38 threaded into a bore 39 at right angles to the bore 34 (Figure 9). In order to provide a firm backing for the rearward end of the cutting tool 36, as well as to assist in the adjustment thereof, the bore 34 of square cross-section opens into a counterbore 40 of circular cross-section. The bore 40 is threaded to receive a headless set screw 41 which, like the set screw 38, can be screwed in or out by applying a suitable wrench thereto.

The tool bit 36 when rotated by the shaft portion 33 of the boring bar 32, cuts a precision bore 45 out of the side walls of a hole 46 which has been drilled in the approximate position desired for the precision bore 45. The upper portion of the boring bar 32 is provided with a tapered shank 47 adapted to fit snugly into a correspondingly tapered socket 48 in the lower end of the rotatable member 12 which is rotatably mounted in the bore 16 and which has a threaded portion 49 immediately below the squared upper end 50 thereof. The latter is adapted to fit a chuck, coupling or socket on or in a power connection, such as a flexible shaft connected to an electric motor (not shown). The upper end of the tapered socket 48 is provided with a threaded counterbore 51 into which the reduced diameter threaded upper end 52 of the boring bar 32 is threaded.

Immediately above the tubular stem 13, the tubular support 11 is provided with an eccentric hollow cup-shaped portion 53 (Figure 1) having a chamber or recess 54 therein, the upper end of which is closed by a cover plate 55 held against the upper edge of the portion 53 by thumb screws 56 threaded into holes 57 therein. The cover plate 55 has an upwardly-projecting tubular portion 58 having a bore 59 therein co-axial with and of substantially the same diameter as the bore 16. The tubular portion 58 is provided with an annular recess 60 containing a C-shaped spring 61 (Figure 11) forming a resilient frictional element which snugly but yieldingly engages the threaded portion 49 of the screw shaft 12 so as to prevent the latter from dropping out of the machine when the feeding mechanism is disconnected in the manner described below.

The feeding mechanism unit generally designated 62 transmits power to the screw shaft 12 by a key 63 seated in an elongated groove or keyway 64 extending lengthwise along the screwshaft 12. The recess 54 consists of a central portion 65 (Figure 4) of circular cross-section and a side portion 66 of cross-section similar to the outline of the letter U. Fitting into the recess 54 are upper and lower plates 67 and 68 respectively (Figures 4 and 7) of a feed gearing unit, generally designated 29. The plates 67 and 68 are of approximately the same outline as the recess 54 and bored to receive the reduced-diameter ends of peripherally-spaced posts 69.

The plates 67 and 68 are provided with aligned holes 71 (Figure 1) adapted to receive a pin or axle 72 upon which pinions 73 and 74 are loosely and rotatably mounted. The pinions 73 and 74 are drivingly interconnected by a tongue and groove connection 75 (Figure 4) so as to rotate in unison. The pinions 73 and 74 mesh respectively with gears 76 and 77 co-axial with the screw shaft 12 and encircling the latter. The gear 76 is drivingly connected to the screw shaft 12 by means of the key 63 (Figure 4) whereas the gear 77 is free from a direct connection with the screw shaft 12.

The gears 76 and 77 and the pinions 73 and 74 preferably differ by one tooth from each other so as to provide a differential rotational effect. For example, the gears 76 and 77 may have 27 and 28 teeth respectively, whereas their corresponding pinions 73 and 74 may have 18 and 17 teeth respectively. Thus, when the gear 76 is rotated in a clockwise direction, by the clockwise rotation of the screw shaft 12 through the key 63, the gear 77 will also rotate in a clockwise direction but at a slightly slower speed. The gears 76 and 77 have hub extensions which are journaled in bores 78 and 79 respectively in the lower and upper plates 68 and 67. Interchangeable feed mechanism units 62 with different gear ratios are provided to obtain different feeding rates for the boring tool 32.

Drivingly secured to the gear 77, as by the screws 80 (Figures 2 and 3) is an annular member 81 having radial dove-tail slots 82 therein (Figure 7). Slidably mounted in the slots 82 are the dove-tail base portions 83 of nut halves 84 in the form of bars having upwardly-projecting arcuate threaded portions 85 (Figure 3) on their inner ends adapted to mesh with the threaded portions 49 of the screw shaft 12. The nut halves 84 constitute the components of a nut device, and are slotted transversely as at 86 (Figure 3) to receive an approximately oval spring 87 which urges them outward out of engagement with the screw shaft 12. The end of the spring 87 is seated as at 88 in the side wall of the cup-shaped portion 53.

The nut halves 84 are provided with partially conical outer surfaces 89 (Figure 8) forming follower portions which mate with conical surfaces 90 forming a wedging member in the cover plate 55 surrounding and leading into the bore 59. In order to move the nut halves 84 into and out of engagement with the threaded portion 49 of the screw shaft 12 by the inter-action of the conical surfaces 89 and 90, the feed mechanism unit 62 is raised and lowered bodily by round-ended pins 91 (Figure 2) which at their upper ends engage the lower plate 68 and pass downward through bores 92 in the bottom wall of the cup-shaped portion 53. The lower ends of the pins 91 rest upon the upper surfaces of cam inclines 93 (Figures 5 and 6) which are secured as by the pins 94 to a cam wheel or disc 95 consisting of halves 96 and 97 secured to one another by the screws 98 and rotatably mounted in an annular groove 99 in the tubular stem 13. The motion of the cam wheel 95 is limited by stop pins 100 and 101 (Figure 6) and provision is made for yieldably holding the wheel 95 in the position shown in Figure 6 by a ball detent 102 urged into engagement with a corresponding recess 103 by a coil spring 104 held in a bore 105 by a screw plug 106.

In order to set the top or point 37 of the tool bit 36 at the proper radius from the axis of rotation of the boring tool 32, a micrometer setting instrument generally designated 107 is provided (Figures 9 and 10). The instrument 107 consists of an arcuate rest 108 of approximately T-shaped cross-section having a cylindrical concave contact surface 109 of substantially the same radius of curvature as the precision ground surface 15 of the enlarged portion 14 on the support 11 so as to fit snugly together. The rest 108 is provided with a central boss 110 which is bored to receive the barrel 111 in which the spindle 112 is mounted. The boss 110 is of course counterbored for the passage of the spindle 112 and the latter is connected to the usual micrometer screw (not shown) which is threaded through the barrel 111 and in turn connected to a thimble 113 telescoping over the barrel 111. The barrel 111 is provided with graduations 114 cooperating with graduations 115 on the bevel portion 116 of the thimble 113. The spindle 112 has a hardened end surface 117 for engagement with the tip 37 of the tool bit 36.

Prior to the operation of the invention, the operator adjusts the tip 37 of the tool bit or cutting tool 36 so that it is at the desired radius of curvature from the axis of rotation of the boring bar 33. This is done by subtracting the radius of the bore 45 to be bored from the known radius of the precision ground cylindrical surface 15, thereby giving the distance at which the point 37 should lie from the precision ground surface 15. Assuming that the graduations 114 and 115 are at zero when end 117 of the spindle 112 lies in contact with the precision ground surface 15 (when the surface 109 of the rest 108 is snugly in contact therewith) (Figure 9), the correct position of the tip 37 of the cutting tool 36 will be determined when the operator rotates the thimble 113 in a sufficient amount to cause the graduations 114 and 115 to read on the same dimension as the difference between the radii of the desired bore 45 and the precision ground surface 15, as stated above. Alternatively, the graduations 114 and 115 can be made direct reading on the radii of the bores 45 in a manner which is obvious from the foregoing description so that the desired radius can be set at once on the graduations.

When this is done, the end 117 of the spindle 112 projects a distance beyond its intersection with the arcuate surface 109 equal to this difference of radii. By placing the surface 109 snugly in contact with the precision ground surface 15, and with the spindle 112 projecting through one of the holes 17, therefor, the end 117 of the spindle 112 will occupy the desired position for the tip 37 of the cutting tool 36. Thus, the operator merely has to loosen the set screw 38 and move the cutting tool 36 radially outward in its bore 34 until its tip 37 contacts the end 117 of the spindle 112, which has been set as indicated above. This he may do by inserting a wrench through the opposite hole 17 into the socket in the headless set screw 41 to screw the latter inward in its bore 40 so as to push the cutting tool 36 radially outward.

When the cutting tool 36 has been properly adjusted in this manner, the set screw 38 is tightened in its bore 39 to lock the cutting tool 36 in position, and the set screw 41 is screwed snugly up against the rearward end of the cutting tool 36 to provide a firm backing or abutment for the latter.

In the operation of the invention, after the cutting tool 36 has been set up to the desired boring radius as described above, the work W is placed upon the bed 29, holes 46 of smaller diameter having been drilled in the approximate locations for the precision holes which are to be bored. The boring machine 10 is then placed upon the upper surface 21 of the work W and the enlarged portion 14 precisely located by using the precision ground surface 18 as a surface of reference against which precision gauge blocks are placed in order to precisely locate the precision ground surface 15 relatively to whatever starting point is used for laying out the various holes 45. For work requiring less precision, in lieu of the gauge blocks, a circular mark of the same diameter as the precision ground surface 18 may be scribed upon the work surface 21 during the layout operations and by the use of precision layout tools. The enlarged portion 14 may then be placed within this scribed circle with the precision ground surface 18 in coincidence therewith.

Assuming that the squared portion 50 of the screw shaft 12 has been connected to the chuck or socket of a flexible shaft or other power source, the boring machine 10 is clamped in the foregoing position by means of the clamp 34 and the motor (not shown) started in operation in order to rotate the shaft 12. The disc 95 is then rotated by the operator to the position shown in Figures 1 and 6, causing the cam inclines 93 to push the pins 91 upward and consequently to move the feed gearing unit 70 upward bodily until the conical surfaces 89 and 90 snugly engage one another. As these surfaces come into engagement, they cause the nut halves 84 to move inward so that their threaded portions 85 engage the threaded portion 49 of the screw shaft 12. Clockwise rotation is imparted to the gear 76 by the rotation of the screw shaft 12 by way of the key 63, assuming the threaded portion 49 to be a right-hand thread and the screw shaft 12 to be rotated in a clockwise direction. This action causes the pinions 73 and 74 to rotate in a counterclockwise direction (Figure 1) causing the gear 77 to rotate in a clockwise direction at a slightly slower speed, by reason of the differential action arising from the single-tooth difference between the various pinions and gears. This has the effect of rotating the nut halves 84 in such a manner that they move the screw shaft 12 upward by a backing off operation while it is moving downward by reason of its rotation and threaded engagement with the nut halves 84. This differential motion gives a resultant slow feeding movement downward.

When the operator desires to check the progress of the boring of the hole 45, he grasps the cam wheel 95 and rotates it in a clockwise direction (Figure 6) causing the cam inclines 93 to move out from beneath the pins 91 permitting the feed gearing unit 70 to drop downward. This action causes the conical surfaces 89 and 90 to separate (Figure 3), whereupon the spring 87 moves the nut halves 84 apart, disengaging the threaded portions 85 and 49 from one another enabling the screw shaft 12 to move freely upward. The operator, of course, halts the rotation of the shaft 12, and then lifts the screw shaft 12 upward, this sliding relatively to the feed gearing unit 70 by reason of the sliding connection between the key 63 and keyway 64. With the lower end of the boring tool 32 raised upward out of the way, the operator then inserts his ordinary or micrometer calipers through one of the holes 17 and makes his measurement of the diameter of the bore 45 being bored.

To resume boring after making such a measurement, the operator pushes the screw shaft 12 downward into the boring position and again starts it in rotation. He then grasps the cam wheel 95 and rotates it in a counterclockwise direction to move the cam inclines 93 beneath the pins 91 (Figure 6) raising the feed gearing unit 70 bodily from the disconnected position of Figure 8 to the connected position of Figure 1. The inter-engagement of the conical surfaces 89 and 90 again causes a squeezing action upon the nut halves 84, causing them to move radially into threaded engagement with the threaded portion 49 of the screw shaft 12. A driving connection is thereby re-established between the nut halves 84 and the screw shaft 12 so that the gearing 76, 73, 74 and 77 is again rotated to cause the rotation of the nut halves 84 to resume the differential feeding motion and apply it to the screw shaft 12 as previously described.

If the operator desires to change the rate of feed, he merely unscrews the thumb screws 56, removes the cover plate 55, lifts out the feed gearing unit 70, and replaces it with another unit having different arrangements of teeth between the various gears and, therefore, providing a different differential feeding motion. When the feed gearing units 70 are to be interchanged, the removal of the cover plate 55 permits the nut halves 84 to spring apart and disengage themselves from the threaded portion 49 of the screw shaft 12. The spring 61 within the portion 58 of the cover plate 55 prevents the accidental dropping of the screw shaft 12 by exerting a sufficient frictional drag upon the latter to do so.

What I claim is:

1. A precision boring machine comprising a supporting structure having a work-engaging portion adapted to rest against the work, a rotatable screw shaft journaled in said structure and having a boring tool holder thereon, a nut device rotatably mounted on said structure and having a threaded nut device including a plurality of transversely-separated threaded components selectively movable into and out of threaded engagement with said screw shaft, feeding mechanism operably connected to said nut device and adapted to rotate said nut device relatively to said screw shaft whereby to impart longitudinal feeding motion to said tool-holder during rotation thereof, said nut components having bevelled surfaces thereon, and a cover member having a tapered abutment surface engageable with said beveled surfaces to urge said components into engagement with said screw shaft.

2. A precision boring machine comprising a supporting structure having a work-engaging portion adapted to rest against the work, a rotatable screw shaft journaled in said structure, and having a boring tool holder thereon, a nut device rotatably mounted on said structure and having a threaded nut device including a plurality of transversely-separated threaded components selectively movable into and out of threaded engagement with said screw shaft, feeding mechanism operably connected to said nut device and adapted to rotate said nut device relatively to said screw shaft whereby to impart longitudinal feeding motion to said tool-holder during rotation thereof, said components having bevelled surfaces thereon, a cover member having a tapered abutment surface engageable with said bevelled surfaces to urge said components into engagement with said screw shaft, said cover member having an annular recess therein adjacent said shaft, and an annular resilient friction element seated in said recess and yieldingly and frictionally engaging said screw shaft.

3. A precision boring machine comprising a supporting structure having a substantially cylindrical precision work-locating surface thereon and a work-engaging portion adapted to rest against the work, a rotatable screw shaft journaled in said structure co-axial with said cylindrical portion and having a boring tool holder thereon, a nut device rotatably mounted on said structure in threaded engagement with said screw shaft, and feeding mechanism operably connected to said nut device and adapted to rotate said nut device relatively to said screw shaft whereby to impart longitudinal feeding motion to said tool-holder during rotation thereof.

4. A precision boring machine comprising a supporting structure having a substantially cylindrical precision work-locating surface thereon and a work-engaging portion adapted to rest against the work, a rotatable screw shaft journaled in said structure co-axial with said cylindrical portion and having a boring tool holder thereon, a nut device rotatably mounted on said structure in threaded engagement with said screw shaft, and feeding mechanism operably connected to said nut device and adapted to rotate said nut device relatively to said screw shaft whereby to impart longitudinal feeding motion to said tool-holder during rotation thereof, said cylindrical surface being disposed on the side of said structure and said work-engaging portion being disposed on the bottom thereof.

5. A precision boring machine comprising a supporting structure having a work-engaging portion adapted to rest against the work, a rotatable screw shaft journaled in said structure and having a boring tool holder thereon, a nut device including a plurality of transversely-separated threaded components rotatably mounted on said structure and selectively movable into and out of threaded engagement with said screw shaft, a resilient frictional element yieldingly and frictionally engaging said screw shaft at a location spaced apart from said nut device, and feeding mechanism operably connected to said nut device and adapted to rotate said nut device relatively to said screw shaft whereby to impart longitudinal feeding motion to said tool-holder during rotation thereof.

6. A precision boring machine comprising a supporting structure having a work-engaging portion adapted to rest against the work, a rotatable screw shaft journaled in said structure and having a boring tool holder thereon, a nut device including a plurality of transversely-separated threaded components rotatably mounted on said structure and movable axially relatively to said screw shaft and also transversely into and out of threaded engagement with said screw shaft, a stationary wedging member, a follower portion on said nut device responsive to the axial motion of said nut device for engaging said stationary wedging member and moving said nut components into threaded engagement with said screw shaft, feeding mechanism operably connected to said nut device and adapted to rotate said nut device relatively to said screw shaft whereby to impart longitudinal feeding motion to said tool-holder during rotation thereof, and a control device operably engaging said nut device to move said nut device and shift said nut components into engagement with said screw shaft.

7. A precision boring machine comprising a supporting structure having a work-engaging portion adapted to rest against the work, a rotatable screw shaft journaled in said structure and having a boring tool holder thereon, a nut device including a plurality of transversely-separated threaded components rotatably mounted on said structure and movable axially relatively to said screw shaft and also transversely into and out of threaded engagement with said screw shaft, feeding mechanism operably connected to said nut device and adapted to rotate said nut device relatively to said screw shaft whereby to impart longitudinal feeding motion to said tool-holder during rotation thereof, said feeding mechanism including a gearing unit drivingly connecting said screw shaft with said nut device, and a control device having cam mechanism operably engaging said gearing unit to shift said gearing unit bodily in an axial direction relatively to said screw shaft, and wedging mechanism responsive to the shifting of said gearing unit to shift said nut components into engagement with said screw shaft.

EDWIN V. STATIA, Sr.

REFERENCES CITED

The following references are of record in the file of this patent:

UNITED STATES PATENTS

| Number | Name | Date |
| --- | --- | --- |
| 1,023,722 | Cluts et al. | Apr. 16, 1912 |
| 1,862,866 | Storm | June 14, 1932 |
| 2,039,728 | Lundell et al. | May 5, 1936 |
| 2,375,448 | Talbot et al. | May 8, 1945 |
| 2,392,564 | Wrenn | Jan. 8, 1946 |
| 2,434,104 | Esseling | Jan. 6, 1948 |
| 2,441,716 | Mitchell | May 18, 1948 |